US012382159B2

(12) United States Patent
Carrion et al.

(10) Patent No.: US 12,382,159 B2
(45) Date of Patent: Aug. 5, 2025

(54) OPTICAL CAPTURING DEVICE COMPRISING FIRST, SECOND AND THIRD OPTICAL SENSORS CAPTURING FIRST, SECOND AND THIRD FIELDS OF VIEW

(71) Applicant: IDEMIA IDENTITY & SECURITY FRANCE, Courbevoie (FR)

(72) Inventors: Grégoire Carrion, Courbevoie (FR); Stéphane Bonnot, Courbevoie (FR); Samuel Alliot, Courbevoie (FR); Rachid Harbi, Courbevoie (FR); Frédéric Touz, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 117 days.

(21) Appl. No.: 18/553,915

(22) PCT Filed: Apr. 19, 2022

(86) PCT No.: PCT/FR2022/050729
§ 371 (c)(1),
(2) Date: Oct. 4, 2023

(87) PCT Pub. No.: WO2022/223921
PCT Pub. Date: Oct. 27, 2022

(65) Prior Publication Data
US 2024/0236514 A1    Jul. 11, 2024

(30) Foreign Application Priority Data
Apr. 19, 2021   (FR) ...................................... 21 04019

(51) Int. Cl.
*H04N 5/335*     (2011.01)
*H04N 23/54*    (2023.01)
(Continued)

(52) U.S. Cl.
CPC ............. *H04N 23/58* (2023.01); *H04N 23/54* (2023.01); *H04N 23/55* (2023.01);
(Continued)

(58) Field of Classification Search
CPC ....................................................... H04N 23/90
See application file for complete search history.

(56) References Cited

U.S. PATENT DOCUMENTS 7,965,314 B1 *   6/2011   Miller ................ H04N 21/2662
                                                                    250/330
9,892,488 B1 *   2/2018   Brailovskiy .............. G06T 5/50
(Continued)

FOREIGN PATENT DOCUMENTS

JP        2003-134375 A       5/2003

OTHER PUBLICATIONS

International Search Report issued Jul. 25, 2022 in PCT/FR2022/050729 filed on Apr. 19, 2022, 15 therein, 2 pages.
(Continued)

*Primary Examiner* — Gary C Vieaux
(74) *Attorney, Agent, or Firm* — Oblon, McClelland, Maier & Neustadt, L.L.P.

(57) ABSTRACT

An optical capturing device includes a holder; a first optical sensor possessing a first field angle centered on a first optical axis; a second optical sensor possessing a second field angle centered on a second optical axis; and a third optical sensor possessing a third field angle centered on a third optical axis. A traffic enforcement device can include such an optical capturing device.

12 Claims, 6 Drawing Sheets

(51) Int. Cl.
   *H04N 23/55*    (2023.01)
   *H04N 23/58*    (2023.01)
   *H04N 23/698*   (2023.01)
   *H04N 23/90*    (2023.01)
   *H04N 23/951*   (2023.01)

(52) U.S. Cl.
   CPC .......... *H04N 23/698* (2023.01); *H04N 23/90* (2023.01); *H04N 23/951* (2023.01)

(56) References Cited

U.S. PATENT DOCUMENTS

| | | | |
   |---|---|---|---|
   | 11,463,610 B2* | 10/2022 | Stein | H04N 23/57 |
   | 2002/0075258 A1 | 6/2002 | Park et al. | |
   | 2016/0148062 A1 | 5/2016 | Fürsich | |
   | 2022/0051042 A1* | 2/2022 | Blais-Morin | G06T 7/97 |
   | 2022/0215750 A1* | 7/2022 | Eldessouki | G08G 1/0116 |

OTHER PUBLICATIONS

French Preliminary Search Report and Written Opinion issued Dec. 10, 2021 in French Application 21 04019 filed on Apr. 19, 2021, 10 pages.

* cited by examiner

OPTICAL CAPTURING DEVICE COMPRISING FIRST, SECOND AND THIRD OPTICAL SENSORS CAPTURING FIRST, SECOND AND THIRD FIELDS OF VIEW

FIELD OF THE INVENTION

The invention relates to the field of the capture of images and more particularly to the capture of traffic enforcement images.

BACKGROUND OF THE INVENTION

Conventionally, a traffic enforcement device comprises an optical device for capturing high-resolution images intended to be automatically processed with a view to extracting therefrom the registration-plate number of vehicles and/or details revealing for example that a continuous line drawn on the roadway has been crossed or use of a mobile telephone by a driver, etc. When the road being monitored comprises a plurality of lanes, it is necessary for the traffic enforcement device to capture an image covering all of the monitored lanes. Such a device then requires use of a sensor with a wide-angle lens of large field angle (small focal length) to be able to cover all of the lanes of the monitored road. The resolution of this sensor must remain high in order for it to be possible to extract therefrom images that will be exploitable by the automatic processing. Such high-resolution sensors coupled with a wide-angle lens are expensive and generate high volumes of data that slow the rate of image capture and require the automatic processing to be performed by very powerful electronics that also have an impact on the cost of production, of exploitation and of storage of the captured images.

Object of the Invention

The object of the invention is to improve the cost of manufacture and/or exploitation of a traffic enforcement device.

SUMMARY OF THE INVENTION

To this end, an optical capturing device is provided, this device comprising:
- a holder,
- a first optical sensor possessing a first sensitive cell able to acquire an image having a first resolution and a first optic having a first field angle centred on a first optical axis defined by a first normed optical vector that defines a first optical field of capture,
- a second optical sensor possessing a second sensitive cell able to acquire an image having a second resolution and a second optic having a second field angle centred on a second optical axis defined by a second normed optical vector that defines a second optical field of capture,
- a third optical sensor possessing a third sensitive cell able to acquire an image having a third resolution and a third optic having a third field angle centred on a third optical axis defined by a third normed optical vector that defines a third optical field of capture.

According to the invention, the third field angle is larger than or equal to sixty percent of the sum of the first field angle and of the second field angle and the first resolution and/or the second resolution is higher than the third resolution. The first optical sensor, the second optical sensor and the third optical sensor are mounted on the holder so as to meet the following conditions:
- the third optical field comprises at least a first segment of the first optical field and at least a second segment of the second optical field;
- the first normed vector, the second normed vector and the third normed vector respect the following relationships:

$$(\vec{C1} \wedge \vec{C}) \cdot (\vec{C2} \wedge \vec{C}) = 0 \text{ or} \quad \text{a)}$$

$$\text{abs}\left(\frac{\vec{C1} \wedge \vec{C}}{\|\vec{C1} \wedge \vec{C}\|} \cdot \frac{\vec{C2} \wedge \vec{C}}{\|\vec{C2} \wedge \vec{C}\|}\right) > 0.996$$

$$(\vec{C2} \wedge \vec{C}) \cdot (\vec{C3} \wedge \vec{C}) = 0 \text{ or} \quad \text{b)}$$

$$\text{abs}\left(\frac{\vec{C2} \wedge \vec{C}}{\|\vec{C2} \wedge \vec{C}\|} \cdot \frac{\vec{C3} \wedge \vec{C}}{\|\vec{C3} \wedge \vec{C}\|}\right) > 0.996$$

$$(\vec{C1} \wedge \vec{C}) \cdot (\vec{C3} \wedge \vec{C}) = 0 \text{ or} \quad \text{c)}$$

$$\text{abs}\left(\frac{\vec{C1} \wedge \vec{C}}{\|\vec{C1} \wedge \vec{C}\|} \cdot \frac{\vec{C3} \wedge \vec{C}}{\|\vec{C3} \wedge \vec{C}\|}\right) > 0.996 \text{ with}$$

$$\vec{C} = \frac{\vec{C1} + \vec{C2} + \vec{C3}}{\|\vec{C1} + \vec{C2} + \vec{C3}\|}$$

in which
C is a resultant normed optical vector corresponding to the sum of the first normed vector, of the second normed vector and of the third normed vector;
C1 is the first normed vector
C2 is the second normed vector
C3 is the third normed vector.

Thus, the device of the invention makes it possible to capture a wide-angle, low-resolution image (delivered by the third sensor) to which images of small field angle and of high resolution (delivered by the first sensor and/or second sensor) may be added, by stitching inter alia. The sensor combination used in the device of the invention is less expensive and more reliable than a high-resolution wide-angle sensor able to cover the same field with a high resolution over the entirety of the field.

Image processing times and the required processing resources are decreased when the first sensitive cell comprises a plurality of first light-capturing elements arranged in a plurality of first rows extending parallel to a first direction defined by a first normed row vector. The second sensitive cell comprises a plurality of second light-capturing elements arranged in a plurality of second rows extending parallel to a second direction defined by a second normed row vector. The third sensitive cell comprises a plurality of third light-capturing elements arranged in a plurality of third rows extending parallel to a third direction defined by a third normed row vector. The first optical sensor, the second optical sensor and the third optical sensor are mounted on the holder so as to also meet the following conditions:
the first normed row vector, the second normed row vector and the third normed row vector respect the following relationships:

$$\text{abs}\left(\frac{\vec{C1} \wedge \vec{H1}}{\|\vec{C1} \wedge \vec{H1}\|} \cdot \frac{\vec{C2} \wedge \vec{H2}}{\|\vec{C2} \wedge \vec{H2}\|}\right) > 0.996 \quad \text{d)}$$

-continued $$\text{abs}\left(\frac{\vec{C1} \wedge \vec{H1}}{\|\vec{C1} \wedge \vec{H1}\|} \cdot \frac{\vec{C3} \wedge \vec{H3}}{\|\vec{C3} \wedge \vec{H3}\|}\right) > 0.996 \quad \text{e)}$$

$$\text{abs}\left(\frac{\vec{C2} \wedge \vec{H2}}{\|\vec{C2} \wedge \vec{H2}\|} \cdot \frac{\vec{C3} \wedge \vec{H3}}{\|\vec{C3} \wedge \vec{H3}\|}\right) > 0.996 \quad \text{f)}$$

in which

H1 is the first normed row vector

H2 is the second normed row vector

H3 is the third normed row vector.

Note: The optical axes of the cameras are by definition not parallel to the sensors and therefore the vectors $\vec{Ci}$ are not colinear with $\vec{Hi}$.

The captured images may be rapidly and reliably stitched when the first optical sensor and the second optical sensor are positioned one with respect to the other on the holder so that the angle made by the first optical axis and the second optical axis respects the following relationship:

$$\Delta_{O1O2} \leq [(\alpha_1 + \alpha_2)/2] - R$$

in which $\Delta_{O1O2}$ is the angle made by the first optical axis and the second optical axis in degrees;

$\alpha_1$ is the first field angle in degrees;

$\alpha_2$ is the second field angle in degrees;

R is a strictly positive angle of optical overlap, advantageously comprised between five percent and thirty percent of the largest angle among the first field angle $\alpha_1$ and the second field angle $\alpha_2$. The total field of observation of the capturing device of the invention is increased when it comprises a fourth optical sensor that possesses a fourth sensitive cell and a fourth optic having a fourth field angle centred on a fourth optical axis oriented along a fourth normed optical vector, and that is mounted on the holder r so as to meet the following conditions:

the third field angle is larger than or equal to sixty percent of the sum of the first field angle, of the second field angle, and of the fourth field angle;

the third optical field comprises at least a fourth segment of the fourth optical field;

the fourth optical vector respects the following relationships:

$$(\vec{C1} \wedge \vec{C'}) \cdot (\vec{C4} \wedge \vec{C'}) = 0 \text{ or} \quad \text{d)}$$

$$\text{abs}\left(\frac{\vec{C1} \wedge \vec{C'}}{\|\vec{C1} \wedge \vec{C'}\|} \cdot \frac{\vec{C4} \wedge \vec{C'}}{\|\vec{C4} \wedge \vec{C'}\|}\right) > 0.996$$

$$(\vec{C2} \wedge \vec{C'}) \cdot (\vec{C4} \wedge \vec{C'}) = 0 \text{ or} \quad \text{e)}$$

$$\text{abs}\left(\frac{\vec{C2} \wedge \vec{C'}}{\|\vec{C2} \wedge \vec{C'}\|} \cdot \frac{\vec{C4} \wedge \vec{C'}}{\|\vec{C4} \wedge \vec{C'}\|}\right) > 0.996$$

$$(\vec{C3} \wedge \vec{C'}) \cdot (\vec{C4} \wedge \vec{C'}) = 0 \text{ or} \quad \text{f)}$$

$$\text{abs}\left(\frac{\vec{C3} \wedge \vec{C'}}{\|\vec{C3} \wedge \vec{C'}\|} \cdot \frac{\vec{C4} \wedge \vec{C'}}{\|\vec{C4} \wedge \vec{C'}\|}\right) > 0.996 \text{ with}$$

$$\vec{C} = \frac{\vec{C1} + \vec{C2} + \vec{C3} + \vec{C4}}{\|\vec{C1} + \vec{C2} + \vec{C3} + \vec{C4}\|}$$

in which C4 is the fourth normed optical vector.

In such a device, image stitching is rapid and reliable when the first optical axis, the second optical axis and the fourth optical axis are secant at one and the same point.

Stitching of the captured images is further improved when the third optical axis is substantially parallel to the centre of the union of the fields of the first optical axis, second optical axis, and fourth optical axis. Advantageously, the first optical sensor and/or the second optical sensor have a first optical field angle and/or a second optical field angle comprised between five and twenty degrees, respectively.

The device of the invention is more economical to produce when the holder is a holder of integral construction.

The capture of scenes comprising moving objects is facilitated when the first optical sensor and/or the second optical sensor is of global-shutter type.

Manufacture of the device is economical when the first optical sensor comprises a lens mounted on a mounting that is moveable with respect to a sensitive cell of the optical sensor, the holder comprising means for elastically linking the holder to the mounting.

The invention also relates to a traffic enforcement device comprising an optical capturing device such as defined above and to a method for generating a traffic enforcement image using a device such as defined above, comprising acquisition of a first image of a road, of a second image of the road and of a third image of the road by the first, second and third sensitive cell of the optical capturing device of the traffic enforcement device, respectively, and integration, into the third image of the road, of the first image of the road and/or of the second image of the road.

Other features and advantages of the invention will become apparent on reading the following description of non-limiting particular embodiments of the invention.

DETAILED DESCRIPTION OF THE INVENTION

Figure 1:
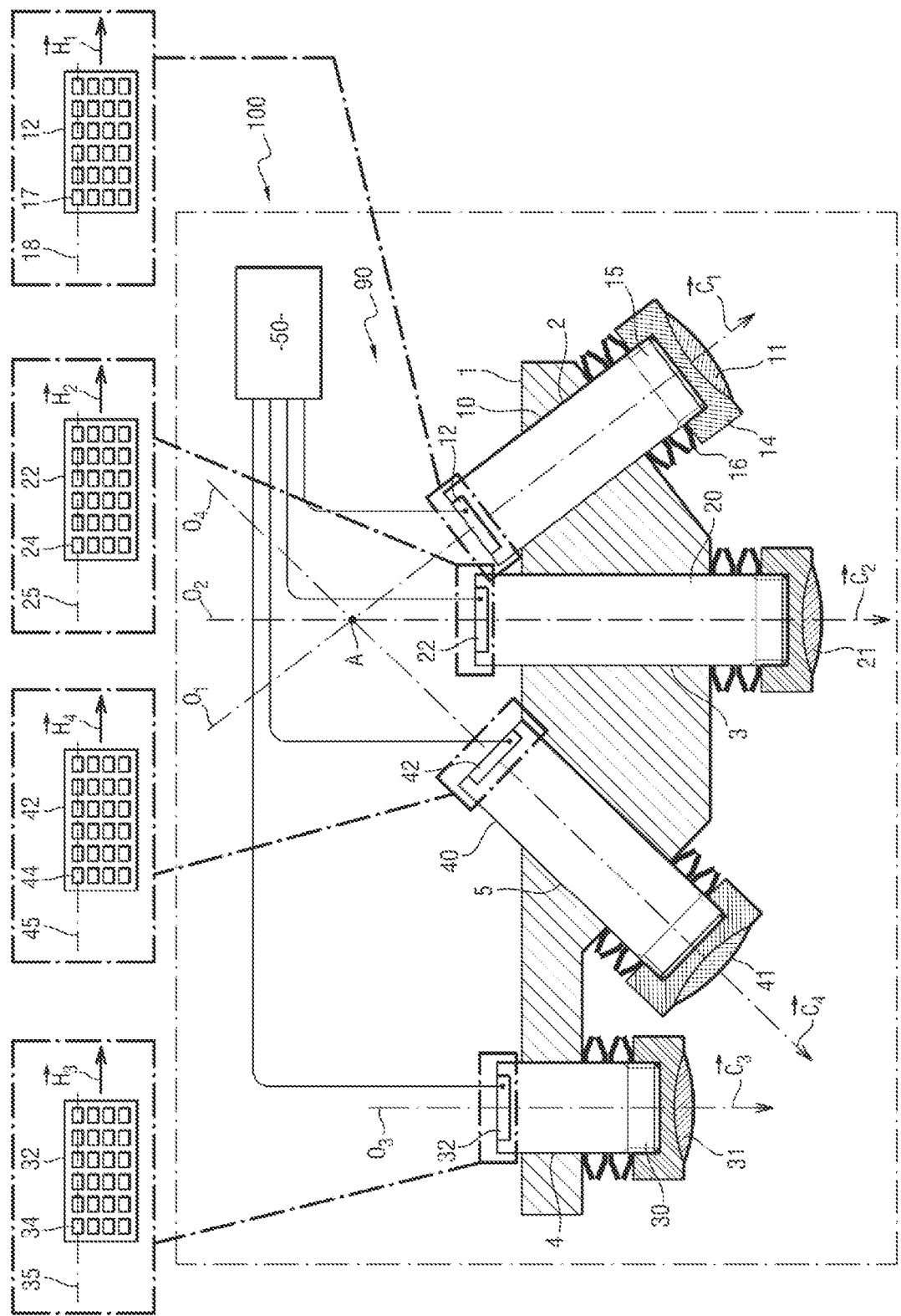
FIG. 1 is a schematic cross-sectional view of the optical capturing device according to the invention.
Figure 2:
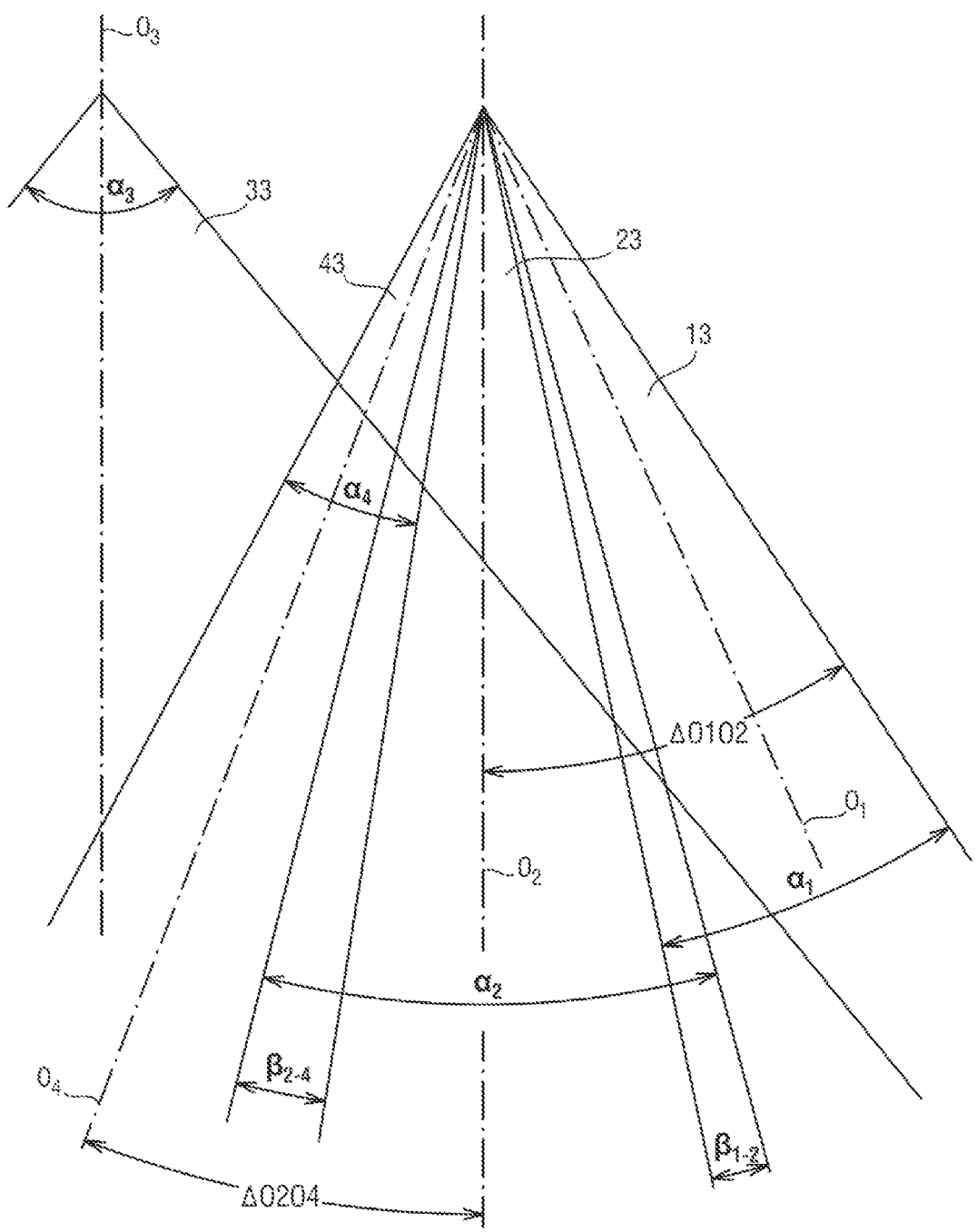
FIG. 2 is a schematic view of the optical field angles and axes of the device of FIG. 1.
Figure 3:
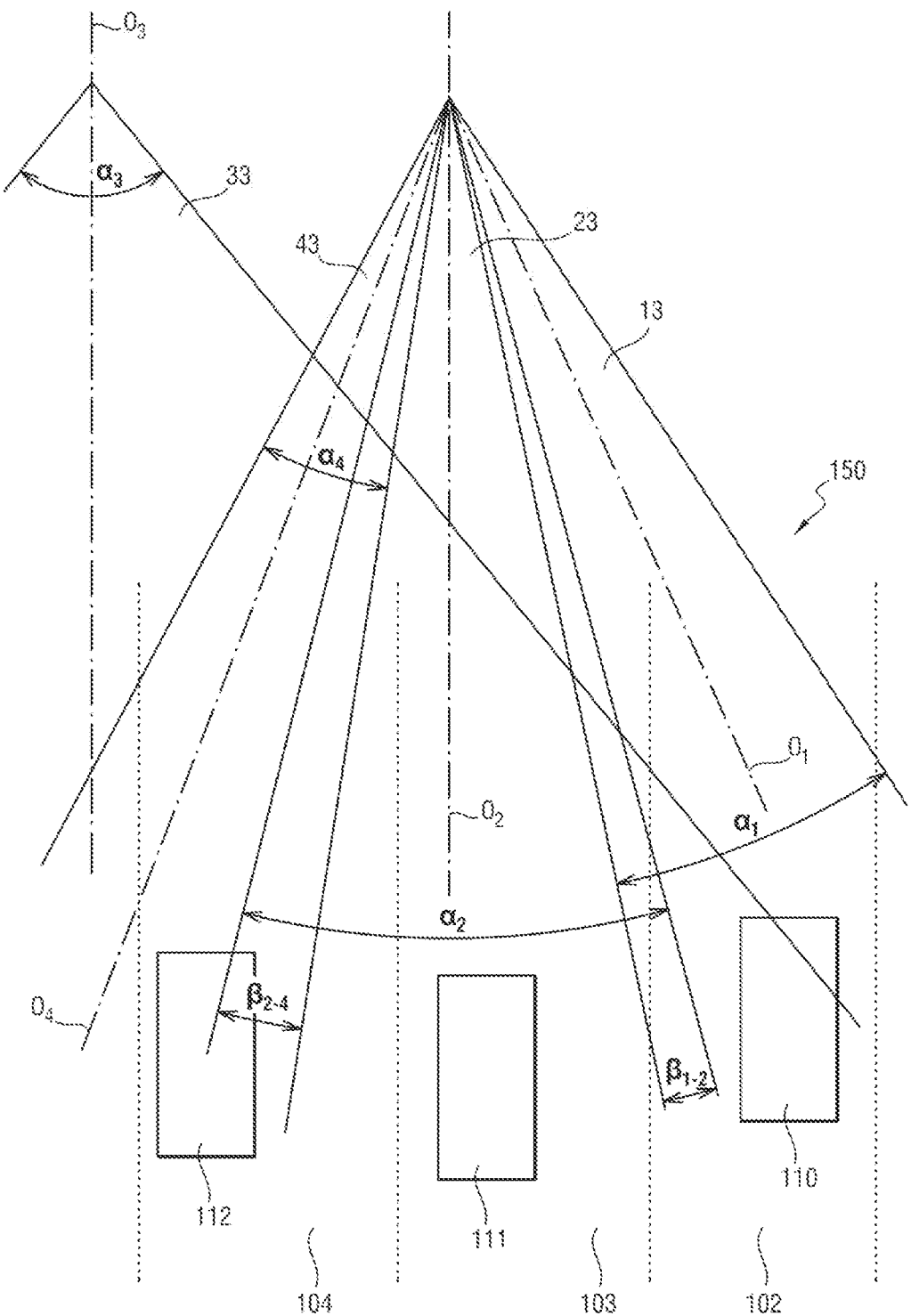
FIG. 3 is a schematic view of capture of a scene by the device of FIG. 1.

With reference to FIGS. 1 and 2, the optical capturing device according to the invention and generally designated 90 comprises a holder 1 of integral construction comprising a first housing 2, a second housing 3, a third housing 4 and a fourth housing 5. The first housing 2 accommodates a first optical sensor 10 possessing a first field angle $\alpha_1$ equal to thirteen degrees and centred on a first optical axis O1. The first optical axis O1 is oriented along a first normed optical vector C1.

The first optical sensor 10 possesses a first lens 11 and a first sensitive cell 12, here of CMOS global-shutter type, here possessing five megapixels, that is connected to a processing unit 50. The first sensitive cell 12 comprises a plurality of first light-capturing elements 17 arranged in a plurality of first rows 18 extending parallel to a first direction defined by a first normed row vector H1. The first optical sensor 10 defines a first optical field of capture 13.

The second housing 3 accommodates a second optical sensor 20 possessing a second field angle $\alpha_2$ equal to thirteen degrees and centred on a second optical axis O2. The second optical axis O2 is oriented along a second normed optical vector C2. The second optical sensor 20 possesses a second lens 21 and a second sensitive cell 22, here of CMOS global-shutter type, here possessing five megapixels, that is connected to the processing unit 50. The second sensitive cell 22 comprises a plurality of second light-capturing elements 24 arranged in a plurality of second rows 25 extending parallel to a second direction defined by a second normed row vector H2. The second optical sensor 20 defines a second optical field of capture 23.

The third housing 4 accommodates a third optical sensor 30 possessing a third field angle $\alpha_3$ equal to forty degrees and centred on a third optical axis O3. The third optical axis O3 is oriented along a third normed optical vector C3.

The third optical sensor 30 possesses a third lens 31 and a third sensitive cell 32, here of CMOS global-shutter type, here possessing three megapixels, that is connected to the processing unit 50. The third sensitive cell 32 comprises a plurality of third light-capturing elements 34 arranged in a plurality of third rows 35 extending parallel to a third direction defined by a third normed row vector H3. The third optical sensor 30 defines a third field of capture 33.

The fourth housing 5 accommodates a fourth optical sensor 40 possessing a fourth field angle $\alpha_4$ equal to thirteen degrees and centred on a fourth optical axis O4. The fourth optical axis O4 is oriented along a fourth normed optical vector C4.

The fourth optical sensor 40 possesses a fourth lens 41 and a fourth sensitive cell 42, here of CMOS global-shutter type, here possessing five megapixels, that is connected to the processing unit 50. The fourth sensitive cell 42 comprises a plurality of fourth light-capturing elements 44 arranged in a plurality of fourth rows 45 extending parallel to a fourth direction defined by a fourth normed row vector H4. The fourth optical sensor 40 defines a fourth field of capture 43.

The lenses 11, 21, 31, 41 are mounted on the holder 1 in such a way as to be moveable along the optical axis, so as to allow the focal point of the lens to be placed on the surface of the sensitive cell. Such an operation of adjustment of focus is known per se. The first lens 11 is here mounted on a tapped ring 14 engaged on a threaded barrel 15 that protrudes from a frontal surface of the holder 1. Elastic Belleville washers 16 are interposed between said frontal surface and one end of the tapped ring 14 in order to compensate for play left after mounting the tapped ring 14 on the threaded barrel 15. The second, third and fourth lenses 21, 31 and 41 are similarly mounted on the holder 1.

As FIG. 2 shows, the first optical sensor 10, the second optical sensor 20, the third optical sensor 30 and the fourth optical sensor 40 are mounted on the holder 1 so that the first optical axis O1, the second optical axis O2, the third optical axis O3 and the fourth optical axis O4 are coplanar. As FIG. 2 also shows, the first optical sensor 10, the second optical sensor 20 and the fourth optical sensor 40 are mounted on the holder so that the first optical axis O1, the second optical axis O2 and the fourth optical axis O4 are secant at one and the same point A.

Practically, the optical capturing device 90 continues to deliver an advantageous performance when the first optical sensor 10, the second optical sensor 20, the third optical sensor 30 and the fourth optical sensor 40 are mounted on the holder 1 so that the first normed optical vector C1, the second normed optical vector C2 and the third normed vector C3 respect the following relationships:

a) $\vec{C2} \wedge \vec{C'} = \vec{0}$ or $$\text{abs}\left(\frac{\vec{C1} \wedge \vec{C'}}{\|\vec{C1} \wedge \vec{C'}\|} \cdot \frac{\vec{C2} \wedge \vec{C'}}{\|\vec{C2} \wedge \vec{C'}\|}\right) > 0.996$$

b) $(\vec{C2} \wedge \vec{C'}) \cdot (\vec{C3} \wedge \vec{C'}) = 0$ or $$\text{abs}\left(\frac{\vec{C2} \wedge \vec{C'}}{\|\vec{C2} \wedge \vec{C'}\|} \cdot \frac{\vec{C3} \wedge \vec{C'}}{\|\vec{C3} \wedge \vec{C'}\|}\right) > 0.996$$

c) $\vec{C3} \wedge \vec{C'} = \vec{0}$ or $$\text{abs}\left(\frac{\vec{C1} \wedge \vec{C'}}{\|\vec{C1} \wedge \vec{C'}\|} \cdot \frac{\vec{C3} \wedge \vec{C'}}{\|\vec{C3} \wedge \vec{C'}\|}\right) > 0.996$$

d) $$\text{abs}\left(\frac{\vec{C1} \wedge \vec{C'}}{\|\vec{C1} \wedge \vec{C'}\|} \cdot \frac{\vec{C4} \wedge \vec{C'}}{\|\vec{C4} \wedge \vec{C'}\|}\right) > 0.996$$

e) $(\vec{C2} \wedge \vec{C'}) \cdot (\vec{C4} \wedge \vec{C'}) = 0$ or $$\text{abs}\left(\frac{\vec{C2} \wedge \vec{C'}}{\|\vec{C2} \wedge \vec{C'}\|} \cdot \frac{\vec{C4} \wedge \vec{C'}}{\|\vec{C4} \wedge \vec{C'}\|}\right) > 0.996$$

f) $\vec{C3} \wedge \vec{C'} = \vec{0}$ or $$\text{abs}\left(\frac{\vec{C3} \wedge \vec{C'}}{\|\vec{C3} \wedge \vec{C'}\|} \cdot \frac{\vec{C4} \wedge \vec{C'}}{\|\vec{C4} \wedge \vec{C'}\|}\right) > 0.996 \text{ with}$$

$$\vec{C} = \frac{\vec{C1} + \vec{C2} + \vec{C3} + \vec{C4}}{\|\vec{C1} + \vec{C2} + \vec{C3} + \vec{C4}\|}$$

in which

C' is a resultant normed optical vector corresponding to the sum of the first normed vector, of the second normed vector, of the third normed vector and of the fourth normed vector;

C1 is the first normed optical vector

C2 is the second normed optical vector

C3 is the third normed optical vector

C4 is the fourth normed optical vector.

The operator "·" which combines the vectors resulting from the various vector products is the operator that returns the "scalar product". The operator "∥ ∥" is the operator that calculates the norm of a vector.

The first optical sensor 10, the second optical sensor 20, the third optical sensor 30 and the fourth optical sensor 40 are, here, mounted on the holder 1 so that the third optical field 33 contains the first optical field 13, the second optical field 23 and the fourth optical field 43. As shown in FIGS. 1 and 2, the third optical axis O3 and the second optical axis O2 are, here, parallel.

The first optical sensor 10 and the second optical sensor 20 are also positioned one with respect to the other on the holder 1 so that the first field of capture 13 has an overlap $\beta_{1-2}$ with the second field of capture 23 at least equal to three degrees.

This is expressed by the following relationship between the angle $\Delta_{O1O2}$ made by the first optical axis O1 and the second optical axis O2:

$$\Delta_{O1O2} \leq [(\alpha_1 + \alpha_2)/2] - R$$

in which $\Delta_{O1O2}$ is the angle made by the first optical axis O1 and the second optical axis O2 in degrees;

$\alpha_1$ is the first field angle in degrees;

$\alpha_2$ is the second field angle in degrees;

R1 is a first angle of optical overlap, here equal to three degrees.

The second optical sensor 20 and the fourth optical sensor 40 are positioned one with respect to the other on the holder 1 so that the second field of capture 23 has an overlap $\beta_{2-4}$ with the fourth field of capture 43 at least equal to three degrees.

This is expressed by the following relationship between the angle $\Delta_{O2O4}$ made by the second optical axis O2 and the fourth optical axis O4:

$$\Delta_{O2O4} \leq [(\alpha_4 + \alpha_2)/2] - R2$$

in which $\Delta_{O2O4}$ is the angle made by the second optical axis O2 and the fourth optical axis O4 in degrees;

$\alpha_2$ is the second field angle in degrees;

$\alpha_4$ is the fourth field angle in degrees;

R2 is a second angle of optical overlap, here equal to three degrees.

Operation of the optical device 90 will be described in the case of its incorporation into a traffic enforcement device 100 monitoring a road 101 comprising a first lane 102, a second lane 103 and a third lane 104. In operation, the processing unit 50 captures a given scene 150 (here a first vehicle 110 in the first lane 102, a second vehicle 111 in the second lane 103, and a third vehicle 112 in the third lane 104) using the optical device 90.

Figure 4:
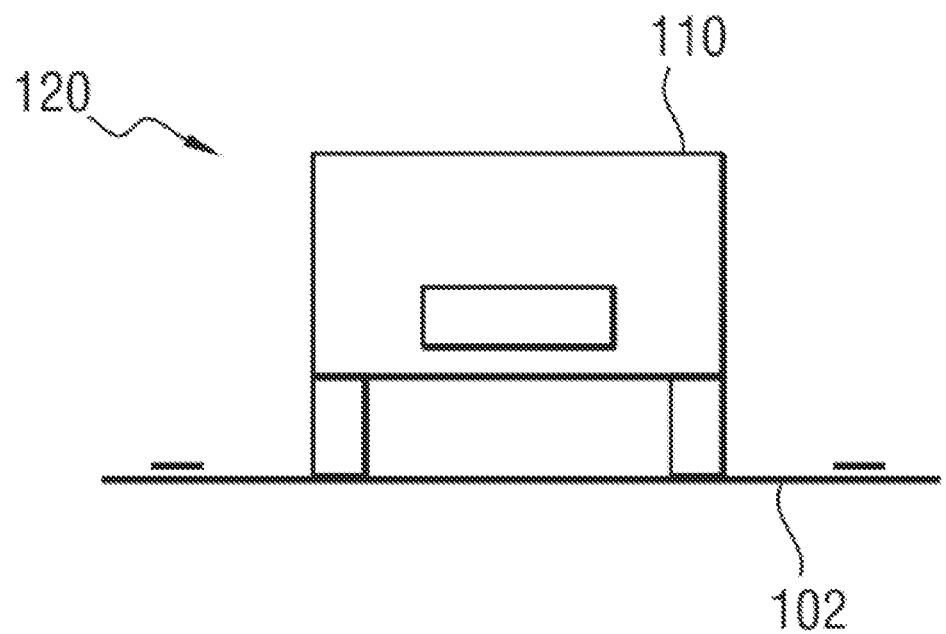
FIG. 4 is a schematic view of a first image captured by the device of FIG. 1.
Figure 5:
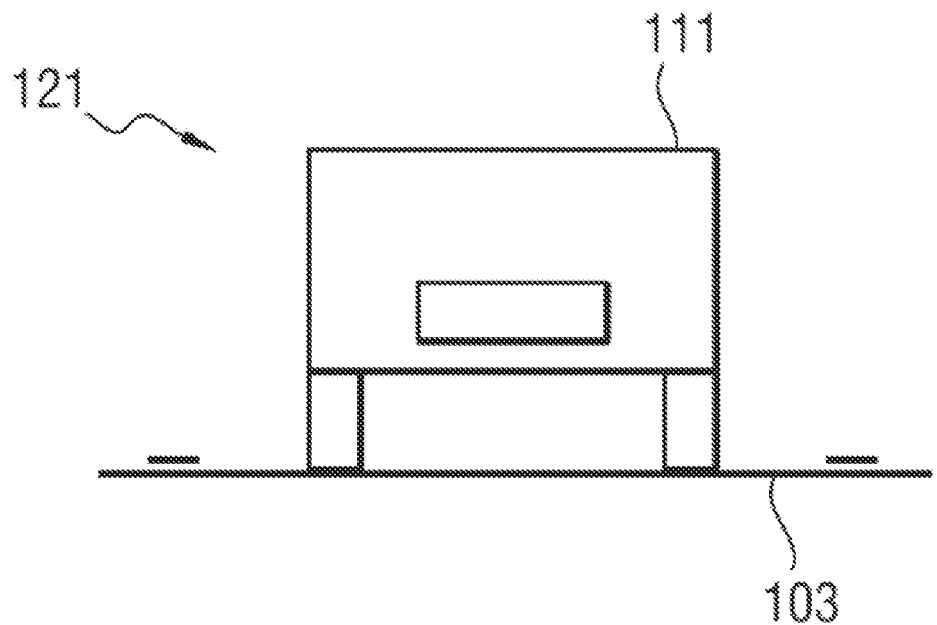
FIG. 5 is a schematic view of a second image captured by the device of FIG. 1.
Figure 6:
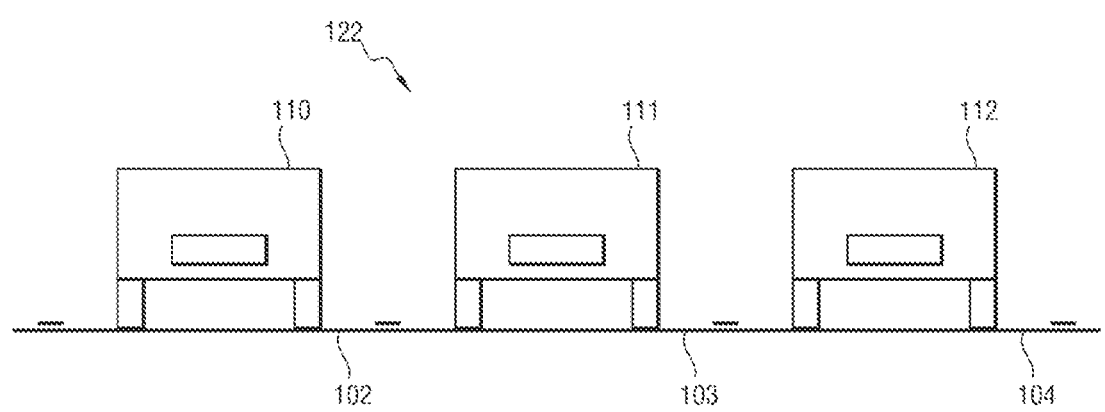
FIG. 6 is a schematic view of a third image captured by the device of FIG. 1.
Figure 7:
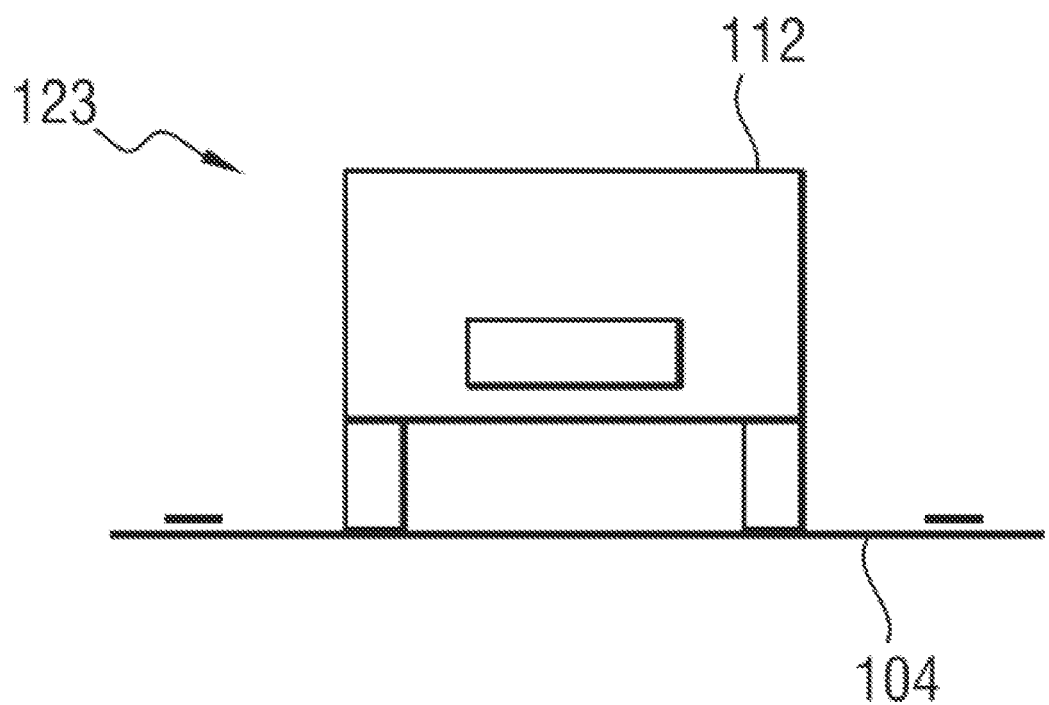
FIG. 7 is a schematic view of a fourth image captured by the device of FIG. 1.

The first sensitive cell 12 generates a first image 120 (FIG. 4), the second sensitive cell 22 generates a second image 121 (FIG. 5), the third sensitive cell 32 generates a third image 122 (FIG. 6), and the fourth sensitive cell 42 generates a fourth image 123 (FIG. 7). These images are stored by the processing unit 50, which stitches them to obtain a fifth image. Techniques allowing images to be combined, especially by stitching, are known per se. An automatic analysis of the fifth image makes it possible to identify the existence of an abnormal situation (continuous lines crossed, non-observance of a stopping distance, driving counterflow or on a hard shoulder, etc.)—here, the abnormal situation in question is the first vehicle 110 driving counterflow.

The processing unit 50 then generates a sixth image that results from stitching the first image 120 in the third image 122. This sixth image allows the vehicle 110 to be clearly identified because the first image 120 possesses a resolution sufficient for this purpose (allowing a registration plate to be read or the face of the driver to be recognized). The sixth image may also act, as it contains all of the elements of the scene 150, as proof of the characterization of the abnormal situation. The electronic file corresponding to the sixth image is of small size with respect to an image captured by a single sensor of large field angle and high resolution.

Of course, the invention is not limited to the described embodiments and encompasses any variant falling within the scope of the invention such as defined by the claims.

In particular:

although here the first, second and fourth sensors possess a field angle equal to thirteen degrees, the invention is also applicable to other types of first, second and fourth sensors possessing a field angle comprised between five and twenty degrees;

any optical sensor is usable (any technology, field angle, number of pixels, dimensions, etc.). Thus, although here the first, second and fourth sensors are CMOS global-shutter sensors, the invention is also applicable to other types of sensors such as rolling-shutter or CCD sensors;

although the holder is here produced by machining a block of metal, it may be obtained by moulding, welding or any other technology or combination of technologies allowing a holder of integral construction to be obtained;

although here the holder is of integral construction, it may be produced by assembly;

although here the third field angle is larger by just one degree than the sum of the first, second and fourth field angles, the invention is also applicable to a device in which the third field angle is larger than or equal to sixty percent of the sum of the first, second and fourth field angles, and preferably 100% and very preferably 120% of the sum of the first, second and fourth field angles;

although here the optical capturing device comprises three optical sensors of small optical field and high resolution—namely first, second and fourth optical sensors—and one optical sensor of large optical field and low resolution—namely a third optical sensor—the invention is also applicable to an optical capturing device comprising a different number of optical sensors, such as for example an optical capturing device comprising two optical sensors of small optical field and high resolution coupled with one optical sensor of large field or even four or more than four optical sensors of small optical field and high resolution combined with one, two or more than two optical sensors of large field and low resolution;

although here the first optical sensor, the second optical sensor, the third optical sensor and the fourth optical sensor are mounted on the holder so that the third optical field contains the first optical field, the second optical field and the fourth optical field, the invention is also applicable to a third optical field that comprises a first segment of the first optical field and a second segment of the second optical field in the case of a capturing device comprising two sensors of small field and high resolution, and to a third optical field that comprises a first segment of the first optical field, a second segment of the second optical field and a fourth segment of the fourth optical field in the case of a capturing device comprising three sensors of large field and high resolution;

although here the first and second angles of overlap are equal to three degrees, the invention is also applicable to any other strictly positive value of the angle of overlap, the first angle of overlap and the second angle of overlap possibly being different.

Although here the description regards embodiments comprising a number of technical features described together, said features are not necessarily linked to one another and each has a technical effect that gives the invention one specific advantage, and hence stand-alone features that do not lead to modifications of other features of an embodiment can be individually taken from one embodiment and duplicated in another in order to give the latter the specific advantage that is associated therewith.

The invention claimed is:

1. An optical capturing device, comprising:
a holder;
a first optical sensor possessing a first sensitive cell configured to acquire a first image of a scene having a first resolution and a first optic having a first field angle centered on a first optical axis oriented along a first normed optical vector that defines a first optical field of capture;
a second optical sensor possessing a second sensitive cell able to acquire a second image of the scene having a second resolution and a second optic having a second field angle centered on a second optical axis oriented along a second normed optical vector that defines a second optical field of capture; and
a third optical sensor possessing a third sensitive cell configured to acquire a third image of the scene having a third resolution and a third optic having a third field angle centered on a third optical axis oriented along a third normed optical vector that defines a third optical field of capture, wherein:
the third field angle is larger than or equal to sixty percent of a sum of the first field angle and of the second field angle, and the first resolution and/or the second resolution is higher than the third resolution;
the first optical sensor, the second optical sensor, and the third optical sensor are mounted on the holder so as to meet the following conditions:
the third optical field comprises at least a first segment of the first optical field and at least a second segment of the second optical field;
the first normed optical vector (C1), the second normed optical vector (C2), and the third normed vector (C3) respect the following relationships:

$$\left(\vec{C1} \wedge \vec{C}\right) \cdot \left(\vec{C2} \wedge \vec{C}\right) = 0 \text{ or} \quad \text{a)}$$

$$\text{abs}\left(\frac{\vec{C1} \wedge \vec{C}}{\|\vec{C1} \wedge \vec{C}\|} \cdot \frac{\vec{C2} \wedge \vec{C}}{\|\vec{C2} \wedge \vec{C}\|}\right) > 0.996$$

$$\left(\vec{C2} \wedge \vec{C}\right) \cdot \left(\vec{C3} \wedge \vec{C}\right) = 0 \text{ or} \quad \text{b)}$$

$$\text{abs}\left(\frac{\vec{C2} \wedge \vec{C}}{\|\vec{C2} \wedge \vec{C}\|} \cdot \frac{\vec{C3} \wedge \vec{C}}{\|\vec{C3} \wedge \vec{C}\|}\right) > 0.996$$

$$\left(\vec{C1} \wedge \vec{C}\right) \cdot \left(\vec{C3} \wedge \vec{C}\right) = 0 \text{ or} \quad \text{c)}$$

$$\text{abs}\left(\frac{\vec{C1} \wedge \vec{C}}{\|\vec{C1} \wedge \vec{C}\|} \cdot \frac{\vec{C3} \wedge \vec{C}}{\|\vec{C3} \wedge \vec{C}\|}\right) > 0.996 \text{ with}$$

$$\vec{C} = \frac{\vec{C1} + \vec{C2} + \vec{C3}}{\|\vec{C1} + \vec{C2} + \vec{C3}\|}$$

in which
C is a resultant normed optical vector corresponding to the sum of the first normed vector (C1), of the second normed vector (C2) and of the third normed vector (C3), C1 is the first normed optical vector (C1), C2 is the second normed optical vector (C2), and C3 is the third normed optical vector (C3).

2. The optical capturing device according to claim 1 wherein:
the first sensitive cell comprises a plurality of first light-capturing elements arranged in a plurality of first rows extending parallel to a first direction defined by a first normed row vector (H1),
the second sensitive cell comprises a plurality of second light-capturing elements arranged in a plurality of second rows extending parallel to a second direction defined by a second normed row vector (H2);
the third sensitive cell comprises a plurality of third light-capturing elements arranged in a plurality of third rows extending parallel to a third direction defined by a third normed row vector (H3), the first optical sensor, the second optical sensor and the third optical sensor being mounted on the holder so as to also meet the following conditions:
the first normed row vector (H1), the second normed row vector (H2), and the third normed row vector (H3) respect the following relationships:

$$\text{abs}\left(\frac{\vec{C1} \wedge \vec{H1}}{\|\vec{C1} \wedge \vec{H1}\|} \cdot \frac{\vec{C2} \wedge \vec{H2}}{\|\vec{C2} \wedge \vec{H2}\|}\right) > 0.996 \quad \text{d)}$$

$$\text{abs}\left(\frac{\vec{C1} \wedge \vec{H1}}{\|\vec{C1} \wedge \vec{H1}\|} \cdot \frac{\vec{C3} \wedge \vec{H3}}{\|\vec{C3} \wedge \vec{H3}\|}\right) > 0.996 \quad \text{e)}$$

$$\text{abs}\left(\frac{\vec{C2} \wedge \vec{H2}}{\|\vec{C2} \wedge \vec{H2}\|} \cdot \frac{\vec{C2} \wedge \vec{H3}}{\|\vec{C2} \wedge \vec{H3}\|}\right) > 0.996 \quad \text{f)}$$

in which
H1 is the first normed row vector (H1), H2 is the second normed row vector (H2), and H3 is the third normed row vector (H3).

3. The optical capturing device according to claim 1, wherein the first optical sensor and the second optical sensor are positioned one with respect to the other on the holder so that the angle made by the first optical axis and the second optical axis respects the following relationship:

$$\Delta_{O1O2} \leq [(\alpha_1 + \alpha_2)/2] - R$$

in which
$\Delta_{O1O2}$ is the angle made by the first optical axis and the second optical axis in degrees;
$\alpha_1$ is the first field angle in degrees;
$\alpha_2$ is the second field angle in degrees; and
R is a strictly positive angle of optical overlap.

4. The optical capturing device according to claim 3, wherein the angle of optical overlap is between five percent and thirty percent of a largest angle among the first field angle $\alpha_1$ and the second field angle $\alpha_2$.

5. The optical capturing device according to claim 1, further comprising a fourth optical sensor possessing a fourth sensitive cell and a fourth optic having a fourth field angle centered on a fourth optical axis oriented along a fourth normed optical vector, the fourth optical sensor being mounted on the holder so as to meet the following conditions:

the third field angle ($\alpha_3$) is larger than or equal to sixty percent of a sum of the first field angle, the second field angle, and the fourth field angle;

the third optical field comprises at least a fourth segment of the fourth optical field; and the fourth optical vector (C4) respects the following relationships:

d) $(\vec{C1} \wedge \vec{C'}) \cdot (\vec{C4} \wedge \vec{C'}) = 0$ or $$\text{abs}\left(\frac{\vec{C1} \wedge \vec{C'}}{\|\vec{C1} \wedge \vec{C'}\|} \cdot \frac{\vec{C4} \wedge \vec{C'}}{\|\vec{C4} \wedge \vec{C'}\|}\right) > 0.996$$

e) $(\vec{C2} \wedge \vec{C'}) \cdot (\vec{C4} \wedge \vec{C'}) = 0$ or $$\text{abs}\left(\frac{\vec{C2} \wedge \vec{C'}}{\|\vec{C2} \wedge \vec{C'}\|} \cdot \frac{\vec{C4} \wedge \vec{C'}}{\|\vec{C4} \wedge \vec{C'}\|}\right) > 0.996$$

f) $(\vec{C3} \wedge \vec{C'}) \cdot (\vec{C4} \wedge \vec{C'}) = 0$ or $$\text{abs}\left(\frac{\vec{C3} \wedge \vec{C'}}{\|\vec{C3} \wedge \vec{C'}\|} \cdot \frac{\vec{C4} \wedge \vec{C'}}{\|\vec{C4} \wedge \vec{C'}\|}\right) > 0.996 \text{ with}$$

$$\vec{C} = \frac{\vec{C1} + \vec{C2} + \vec{C3} + \vec{C4}}{\|\vec{C1} + \vec{C2} + \vec{C3} + \vec{C4}\|}$$

in which C4 is the fourth normed optical vector (C4).

6. The optical capturing device according to claim 3, wherein the first optical axis, the second optical axis, and the fourth optical axis are secant at one and the same point.

7. The optical capturing device according to claim 1, wherein the first optical sensor and/or the second optical sensor have a first optical field angle and/or a second optical field angle comprised between five and twenty degrees, respectively.

8. The optical capturing device according to claim 1, wherein the holder is a holder of integral construction.

9. The optical capturing device according to claim 1, wherein the first optical sensor and/or the second optical sensor is of global-shutter type.

10. The optical capturing device according to claim 1, wherein the first optical sensor comprises a lens mounted on a mounting that is moveable with respect to a sensitive cell of the optical sensor, and the holder comprising means for elastically linking the holder to the mounting.

11. A traffic enforcement device comprising the optical capturing device according to claim 1.

12. A method for generating a traffic enforcement image, the method comprising:

acquiring a first image of a road, a second image of the road, and a third image of the road by the first, second, and third sensitive cell, respectively, of the optical capturing device of the traffic enforcement device according to claim 11; and integrating, into the third image of the road, the first image of the road and/or the second image of the road.

* * * * *